July 26, 1938.　　　C. E. HATHAWAY　　　2,125,160
VALVE GEAR
Filed March 14, 1934　　　2 Sheets-Sheet 1
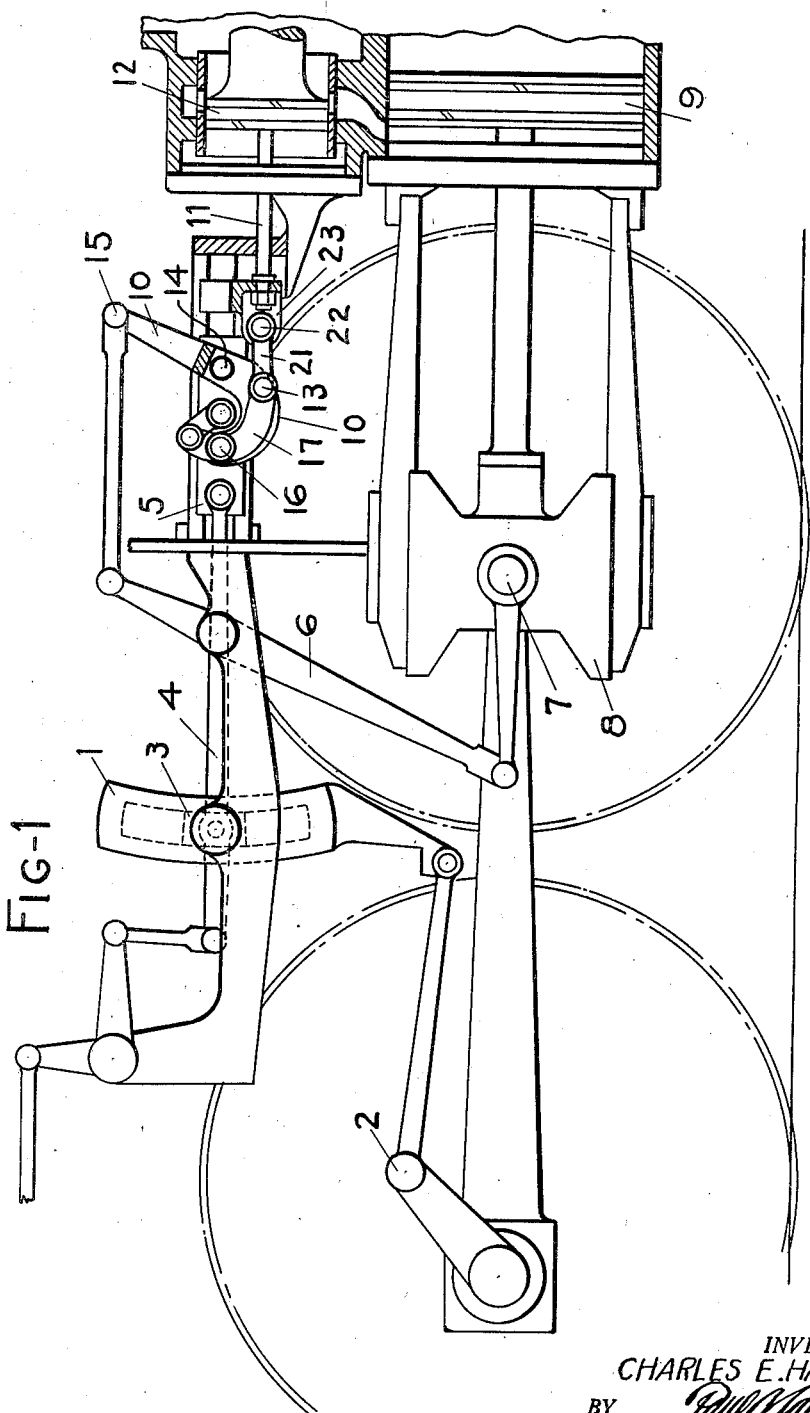
INVENTOR.
CHARLES E. HATHAWAY
BY
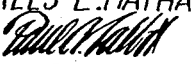
PAUL A. TALBOT
ATTORNEYS.

July 26, 1938.   C. E. HATHAWAY   2,125,160
VALVE GEAR
Filed March 14, 1934   2 Sheets-Sheet 2
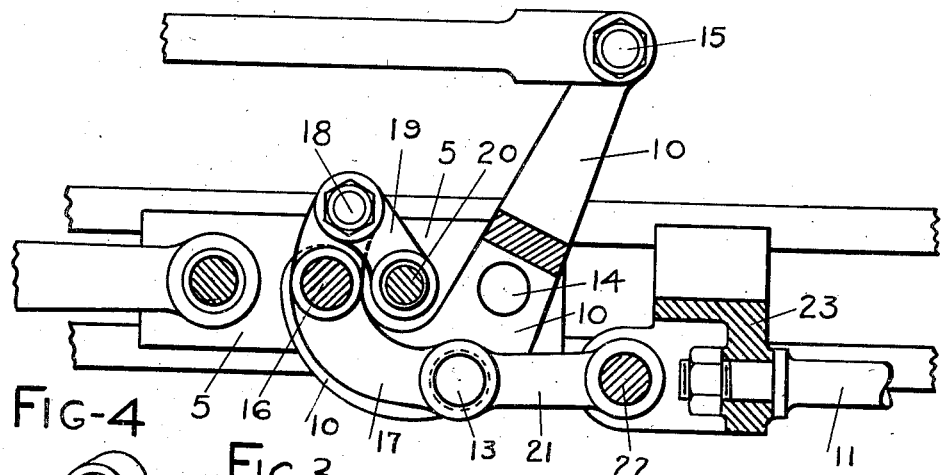
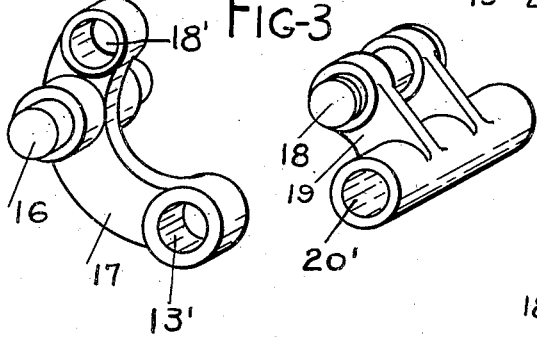
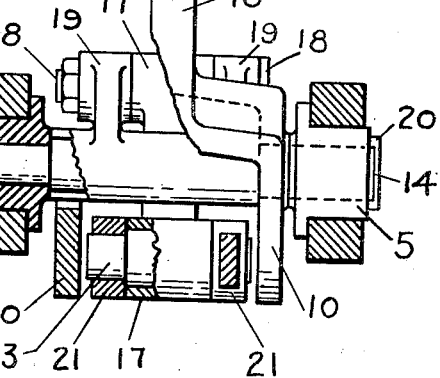
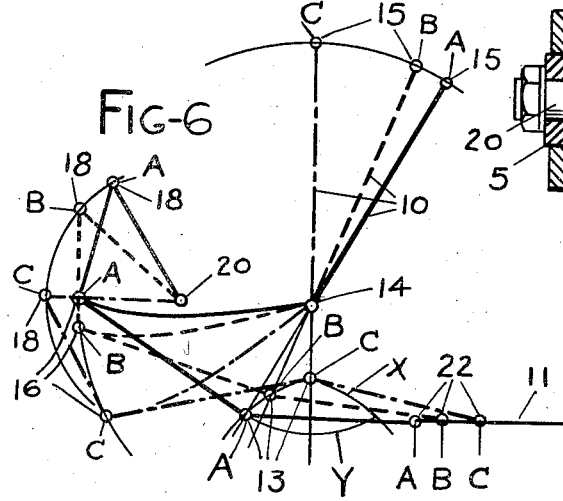
INVENTOR.
CHARLES E. HATHAWAY
BY Paul A. Talbot
PAUL A. TALBOT
ATTORNEYS.

Patented July 26, 1938

2,125,160

UNITED STATES PATENT OFFICE 2,125,160

VALVE GEAR

Charles E. Hathaway, New York, N. Y.

Application March 14, 1934, Serial No. 715,442

10 Claims. (Cl. 121—163)

My invention relates to an improvement in valve gears, and particularly to the valve gear for steam locomotives, and has for its object:

To provide a valve lever and connections between it and the engine's valve to increase the relative speed of the motion of the engine's steam valve at and near the end of the piston and the valve's travel to obtain more and quicker steam port opening and closing to eliminate early preadmission and reduce wire drawing.

To provide a valve motion directly connected to and operated by the engine's crosshead and reverse link to give a maximum speed of valve movement near the ends of the piston's stroke and a correspondingly retarded relative movement of the valve at mid travel of the piston by means of an arm mounted on and carried by the valve lever.

To provide an arm connection between the engine's valve lever and valve stem which effects a change in the relative travel of the admission valve and the valve lever which operates the admission valve.

To provide an arm and links secured to the valve lever to slow down the relative speed of the valve at and near the center of its travel, thereby obtaining later release of exhaust steam for any given cut off and therefore greater relative expansion.

To obtain a longer maximum cut off by retarding the motion of the valve near the center of the stroke of the piston and relatively hastening the motion of the valve at the ends of the stroke for increasing the starting or "lifting power" of the locomotive.

I accomplish these and other objects by the construction herein described and illustrated in the accompanying drawings forming a part hereof, in which:

Fig. 1 is an elevation and general view showing the application of my device.

Fig. 2 is a section near the center line of the valve stem and other parts of my device.

Fig. 3 is a perspective view of the accelerator link.

Fig. 4 is a perspective view of the accelerator lever or arm.

Fig. 5 is a fragmentary view and section of the valve lever and valve crosshead.

Fig. 6 is a diagrammatic view of the elements of my device showing three positions and their effect of the radial relationship to the valve lever in increasing the speed of the valve near the ends of its travel with respect to the speed near the center of the travel of the valve.

Similar reference characters refer to similar parts throughout the several views of the accompanying drawings, as herein described.

It is not the purpose of this specification to describe any of the well known parts of the usual locomotive valve gear, nor to confine, by so doing, my device to any one of a number of typical valve motions commonly used in operating the valves of modern locomotives, as my device will improve the events common to those now in use.

It is however important to consider the motion produced by the typical valve gear to show how a change results by interposing my device between the usual parts and the valve operated thereby. Thus, the motion is typical and unchanged as to the operation of the link 1, and the pin 2, rocking said link in the usual manner, as well as the link block 3, and radius bar 4, as well as the cross head 5, moved by the parts just described by said pin 2.

The motion of the lap and lead lever 6, also receives and imparts motion by means of the pin 7, secured to the crosshead 8, driven by the piston 9, in the usual manner. Said lever 6, also moves the valve lever 10, in direct relationship to said crosshead 8, as is the case with various types of locomotive valve gears.

The valve lever 10, however, is of a special design as it does not move the valve stem 11, and the valve 12, in a true relation to any pin such as 13, if secured thereto. As said lever 10 rocks, the pin 13 at and near the end of the stroke of said lever is at a greater distance from the pin 14, on which said valve lever is mounted and rocks. This change in relationship between the pins 13 and 14 may be seen by referring to the diagrammatic view Fig. 6, in which the end of the stroke of the parts is designated by A.

Referring to Fig. 6 and the other views of the drawings, the motion of the parts of my device may be followed. The valve lever 10 is moved by the pin 15, which travels in direct relation to the main crosshead 8 of the engine, which is connected to the piston 9 in the usual manner, therefore a true relation of travel is imparted to said valve lever 10 by the piston.

The other motion to the valve lever 10 is accomplished through the radius rod or bar 4, which is moved by its connection to the link block 3 and link 1, which is in turn moved by the pin 2 in the usual manner. The bar 4 is connected at one end to the crosshead 5, to which the pin 14 is secured. The lever 10 is swingingly mounted on the pin 14, which, in its horizontal movement effects an angular change in the position of said lever independent of the motion imparted to it by the pin 15.

The motion of the valve and valve stem, and the unusual manner of changing the relative speed of travel of the valve may be better understood by the fact that the pin 13 in the usual construction would be fixed in the lever 10 and move about the pin 14 at a fixed radius, thus moving the valve by means of the link 21 and valve stem 11 in true relation to the lower end of the valve lever 10. I however, have interposed the arm 17, which is connected to the lever 10 by means of the pin 16, said pin 16 moving about the pin 14, while the pin 13 instead of being attached to the lever 10 is fixed in one end of arm 17 and moves about the pin 16. The opposite end of said arm and the pin 18 fixed therein is effected by the link 19 which is secured to said pin 18 at one end and the pin 20 at its opposite end. Said pin 20, like the pin 14, is fixed in the crosshead 5. By referring to Fig. 6, the movement of pin 13 may be traced as it travels along the path x instead of along the path y as in the case of the usual valve connection to the valve lever.

Three positions of travel are given and designated by A, B and C, as well as shown by a full line for A position, a dotted line for B position and a dot and dash line for C position. C position represents the center position of the parts, while one of the end positions is shown and designated by A. The movement of the pins 14 and 20 is not attempted, as the diagram would be too confused by the added lines, nor is it the purpose of Fig. 6 to attempt to show all motion imparted to the valve stem and the pin 13. The object is, however, to show that the distance between the pins 13 and 14 is greater at the end of travel as at A than when at C. By changing the distance radially of the pin 13 to the pin 14, the relationship between the pins 13 and 14 constantly changing, and 15 remaining fixed, causes the relative travel of the valve stem 11 to be increased at A as compared with C. Therefore, as the piston travels in true relationship with the pin 15, the pin 13, travelling at a shorter distance from the pin 14 at the center than at the ends of the travel of the lever 10, as may be seen by the line x of Fig. 6, the relative valve movement is accelerated at the ends of the stroke as compared with the center. The pin 16 travels on an arc about the pin 14, while the pin 18 travels on an arc about the pin 20, which causes the arm 17 to be moved, carrying the pin 13 at its lower end along an arc about the pin 16 tangent to the center line of the pins 13, 14 and 15, which is also a radial line therefore from the pin 14.

Thus, it will be seen that said pin 13, will accelerate the movement of the valve stem 11, and valve 12, at the position A, which is due to a relative greater radial distance between the pins 13 and 14 at this position, and thus increases the relative travel in proportion to the travel of the pin 15, directly connected to and moved by the crosshead 8. The movement of the crosshead 5, and the pin 14 on which the lever 10 is swingingly mounted is connected to and moved by the pin 2, when said crosshead 8 is at the end of its stroke. The crosshead 5 moves in the opposite direction from the pin 15 at this point when the link block 3 is off the central position in the link 1.

At the position C it will be seen by referring to Fig. 6, the radial relationship between the pins 13 and 14 is greatly reduced, which causes a slower motion to the valve stem and valve 12 at this center position in relation to the travel of the pin 15, which has the usual relative speed of travel of the crosshead 8.

At the positions A and B the pin 2, is at its greatest relative speed of travel in relation to the crosshead 8, which is at the end of its stroke as the valve has just opened to admit steam to force the return of the piston 9, all of which makes the rapid movement of the valve at and near the end of its travel of the greatest importance when the events are critical, due to the events which occur near the end and beginning of the stroke of both the valve and piston.

The line x in Fig. 6 represents the general path of travel of said pin 13, while the line y would be the path of travel of the pin 13, if it were fixed in the lower end of said valve lever 10, as is customary and typical of the various locomotive valve gears in common use. The pin 16, in the end of the valve lever 10, oscillates and swings around the pin 14, the upper end of the arm 17, being forced to travel, due to the link 19, and pin 18, around the pin 20, causes the swinging of said arm 17, by the radial difference between the pins 14 and 16, and the pins 20 and 18.

The pin 13, is connected and imparts motion to the valve 12, and valve stem 11, by means of the link 21, and pin 22, of the valve crosshead 23, which is guided in the usual manner.

In addition to the motion of the valve lever 10, due to its connections to the crosshead 8, the usual motion through the radius rod 4, to the crosshead 5, is provided. The consequent relative slowness of travel of said crosshead 8, at the end of its stroke, like the typical valve gear, is offset by the motion of the maximum speed imparted in moving the cross head 5, through the radius rod 4, link 1, and pin 2. However, due to the characteristics of my device in accelerating speed near the ends of travel by the valve, additional rapidity of valve movement results, causing the important events to take place.

This rapid movement of the valve hereinbefore described, at and near the ends of its travel of any given distance, naturally means a slower movement at its mid travel, and causes quicker opening of the steam ports, a consequent quicker closing of steam ports and later opening of exhaust, all of which make for ideal valve events.

In Figures 3 and 4 of the drawings, the aperture 18' receives the pin 18, the aperture 13' the pin 13, and the aperture 20' the pin 20.

I have shown but one construction as well as one application of my invention, which obviously may be modified to suit the conditions of construction, as may seem most desirable. A great variety of valve motions and gears may be improved by the application of my device. I therefore do not wish to be limited to the detailed construction shown, as I may depart therefrom within the scope of my invention, as succinctly set forth in the appended claims.

I claim:

1. In a valve motion, a valve crosshead, a pin mounted in said valve crosshead, a valve lever swingingly mounted thereon, a valve stem and valve moved by said valve lever, means connecting said valve stem and said valve lever comprising an arm swingingly mounted between its ends on said valve lever, a link connected to one end of said arm swingingly secured to the valve crosshead and a pin in the opposite end of said arm and a link secured thereto connecting said arm to the valve stem whereby the radial distance of said pin in the end of said arm and the pin on which said valve lever is mounted is increased at the ends of the stroke and decreased near the center of the stroke to affect the speed of movement of said valve throughout its travel and to prevent vertical movement of the valve lever.

2. In an engine valve motion, a valve crosshead, and radius bar connected thereto, a valve lever swingingly mounted on a pin mounted in said valve crosshead, a pin mounted in said valve lever and an arm swingingly mounted on said pin at a point between its ends, a pin and link connecting one end of said arm to the crosshead on which said valve lever is swingingly mounted, a pin and link connecting the opposite end of said arm to the engine valve whereby said pin in said arm connecting the engine valve is forced to travel radially to and away from the said pin on which said valve lever is swingingly mounted to vary the relative speed of said valve in relation to the speed of said valve crosshead and preventing said valve lever and the valve end of said radius bar from vertical movement.

3. In an engine valve motion, a reverse link motion moved by the crank shaft of the engine having a radius bar and crosshead moved horizontally thereby, a piston, an engine valve operated by said valve motion and crosshead and a valve lever moved by said piston and a pin held in the crosshead to which the radius bar is connected swingingly mounting said valve lever, and an arm swingingly mounted on said valve lever, a pin between the ends of said arm swingingly mounting said arm to said valve lever, one end of said arm being connected to said crosshead to which said radius bar is connected and the opposite end being connected to the engine valve whereby an acceleration of motion is accomplished at the ends of travel of the engine valve in relation to the movement of said valve crosshead.

4. In a valve motion for engines having an engine crosshead, a valve crosshead and a radius rod connected to and guided by said valve crosshead imparting motion thereto, a valve lever pivotally connected to said valve crosshead and connected to the crosshead of the engine, an arm and a pin between its ends swingingly connecting said arm to the end of said valve lever, a link connecting one end of said arm to said valve crosshead the other end of said arm positioned to travel radially to and from the pivotal connection of said valve lever to said valve crosshead and connected to the engine valve thereby affecting the relative movement of the engine valve in relation to the movement of the valve lever.

5. In an engine valve motion having a valve lever and a radius rod, a valve crosshead and a valve operated thereby, means restraining said valve lever and radius rod from vertical motion at its every stroke and means comprising a link connected to and operated by said valve lever and connected to said valve and radius rod to accelerate the movement of said valve at the ends of its movement in relation to the movement of the valve lever and radius rod.

6. In an engine valve motion having a valve lever and radius rod and valve operated thereby, means operated by said valve lever and radius rod for accelerating the relative movement of said valve at the ends of its movement in relation to the movement of said valve lever and radius rod and means restraining the vertical movement of said valve lever and radius rod at each stroke and a link connecting said valve accelerating means to the engine valve.

7. In an engine valve motion having a valve a valve crosshead lever and a radius rod and a valve operated thereby, means restraining said valve lever and radius rod from vertical motion at the ends of each stroke and means comprising a link connected to and operated by said valve lever and connected to said valve and radius rod to accelerate the relative movement of said valve at the ends of its movement in relation to the movement of the valve lever and radius rod, and a valve crosshead secured to said engine valve having accelerated movement relative to the movement of said valve lever and radius rod which impart motion to said valve crosshead.

8. In an engine valve motion having a valve, a valve lever and radius rod and valve operated thereby, means operated by said valve lever and radius rod for accelerating the relative movement of said valve at the ends of its movement in relation to the movement of said valve lever and radius rod and means restraining the vertical movement of said valve lever and radius rod at the ends of each stroke and a link connecting said valve accelerating means to the engine valve, and a valve crosshead secured to said engine valve having accelerated movement relative to the movement of the valve lever and radius rod which impart motion to said valve crosshead.

9. In an engine valve motion having a valve, a valve lever and radius rod and valve operated thereby, means operated by said valve lever and radius rod for accelerating the relative movement of said valve at the ends of its movement in relation to the movement of said valve lever and radius rod and means restraining the vertical movement of said valve lever and radius rod at each stroke and a link connecting said valve accelerating means to the engine valve and a valve crosshead secured to said engine valve having accelerated movement relative to the movement of the valve lever and radius rod which impart motion to said valve crosshead, and a crosshead directly connected to said radius rod having a movement varying from the movement of said valve crosshead.

10. In an engine valve motion having a valve, a valve lever and radius rod and valve operated thereby, means operated by said valve lever and radius rod for accelerating the relative movement of said valve at the ends of its movement in relation to the movement of said valve lever and radius rod and means restraining the vertical movement of said valve lever and radius rod at the ends of each stroke and a link connecting said valve accelerating means to the engine valve and a valve crosshead secured to said engine valve having accelerated movement relative to the movement of the valve lever and radius rod which impart motion to said valve crosshead, and a crosshead directly connected to said radius rod having a movement varying from the movement of said valve crosshead, said valve lever being connected to and carried by said crosshead and connected to said valve crosshead.

CHARLES E. HATHAWAY.